(12) United States Patent
Tsukioka et al.

(10) Patent No.: US 11,745,250 B2
(45) Date of Patent: Sep. 5, 2023

(54) SWAGING DEVICE AND SWAGING METHOD

(71) Applicant: MITSUBISHI HEAVY INDUSTRIES, LTD., Tokyo (JP)

(72) Inventors: Yuki Tsukioka, Tokyo (JP); Akira Ikada, Tokyo (JP); Michinobu Takahagi, Shiga (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/336,621

(22) Filed: Jun. 2, 2021

(65) Prior Publication Data

US 2021/0379645 A1    Dec. 9, 2021

(30) Foreign Application Priority Data

Jun. 5, 2020  (JP) ................... 2020-098656

(51) Int. Cl.
    *B21J 15/04*   (2006.01)
(52) U.S. Cl.
    CPC ..................... *B21J 15/04* (2013.01)
(58) Field of Classification Search
    CPC ............... B21J 15/02; B21J 15/04; B21J 9/06
    See application file for complete search history.

(56) References Cited

U.S. PATENT DOCUMENTS

| | | | |
|---|---|---|---|
| 3,561,102 A * | 2/1971 | Diemer | B21J 15/02 29/524.1 |
| 4,630,463 A | 12/1986 | Knowlton | |
| 5,082,411 A * | 1/1992 | Auriol | F16B 19/06 29/524.1 |
| 5,279,024 A | 1/1994 | Zieve et al. | |
| 5,680,690 A * | 10/1997 | Briles | B21J 15/02 29/524.1 |
| 6,988,862 B1 * | 1/2006 | Iguchi | F16B 19/1027 411/501 |
| 2018/0148194 A1 | 5/2018 | Hood et al. | |
| 2019/0134699 A1 | 5/2019 | Inagaki et al. | |

FOREIGN PATENT DOCUMENTS

| JP | 2017205802 A | 11/2017 |
|---|---|---|
| JP | 2018122354 A | 8/2018 |

\* cited by examiner

*Primary Examiner* — Ryan J. Walters
*Assistant Examiner* — Kyle A Cook
(74) *Attorney, Agent, or Firm* — KANESAKA BERNER AND PARTNERS LLP

(57) ABSTRACT

Provided is a swaging device including: an upper anvil that is disposed in a state in which the upper anvil faces an end surface of a head of a rivet; a lower anvil that is disposed in a state in which the lower anvil faces an end surface of a shaft portion of the rivet; and a pressurizing mechanism that generates a pressurizing force of causing a distance between the upper anvil and the lower anvil along an axial line to decrease and plastically deforms the rivet, in which an end surface of the upper anvil includes a bottom surface that perpendicularly intersects the axial line X and a support surface that has a projecting length in a direction of the axial line with respect to the bottom surface gradually increasing from an inner circumferential side toward an outer circumferential side in the radial direction formed therein, and an inclination angle of the support surface is smaller than an inclination angle of the inclined surface of the rivet by a predetermined angle.

8 Claims, 6 Drawing Sheets

SWAGING DEVICE AND SWAGING METHOD

CROSS-REFERENCE TO RELATED APPLICATIONS

This application is based on Japanese Patent Application No. 2020-098656 filed Jun. 5, 2020, the contents of which are incorporated herein by reference in its entirety.

BACKGROUND

1. Technical Field

The present disclosure relates to a swaging device and a swaging method that deform a rivet inserted into a through-hole formed in a plurality of plate-shaped members disposed in a superimposed state to secure the plurality of plate-shaped members.

2. Description of Related Art

In the related art, a device that forms a through-hole in two or more members in an aircraft body panel or the like and deforms a fastener inserted into the through-hole to secure the two or more members is known (see Japanese Unexamined Patent Application, Publication No. 2018-122354, for example). The device disclosed in Japanese Unexamined Patent Application, Publication No. 2018-122354 is adapted such that a pair of dies are disposed both at a head portion and at an end portion of a shaft portion of a fastener and a force of causing the pair of dies to approach each other is applied thereto to plastically deform the fastener.

In Japanese Unexamined Patent Application, Publication No. 2018-122354, an example in which dies with flat end surfaces are caused to come into contact with the head portion with a flat end surface to plastically deform the fastener is illustrated.

BRIEF SUMMARY

In a case in which a clearance is formed between the fastener and the through-hole after the head portion of the fastener is plastically deformed, fatigue strength of a portion fastened with the fastener is degraded. Therefore, it is desirable that the head portion be appropriately plastically deformed such that no clearance is formed between the fastener and the through-hole. Also, a fastener called a Briles rivet with a shape projecting on the outer circumferential side beyond a center portion of a head portion is known as a fastener with a head portion having an outer diameter that is more likely to be enlarged through plastic deformation. Using of the Briles rivet enables the outer diameter of the head portion to be enlarged through plastic deformation, and the rivet can come into close contact with the through-hole. However, if the Briles rivet is excessively plastically deformed, there is a probability that a clearance is generated between the rivet and the through-hole due to influences of the plastic deformation of the head portion.

The present disclosure was made in view of the aforementioned problem, and an object thereof is to provide a swaging device and a swaging method that enable excessive plastic deformation of a head of a rivet to be curbed and enable degradation of fatigue strength at a part fastened with the rivet due to formation of a clearance between the rivet and through-hole to be prevented.

In order to solve the aforementioned problem, the present disclosure employs the following solutions.

In other words, according to an aspect of the present disclosure, there is provided a swaging device that deforms a rivet inserted into a through-hole formed in a plurality of plate-shaped members disposed in a superimposed manner and secures the plurality of plate-shaped members, the rivet including a shaft portion that extends along an axial line and has a first outer diameter in a radial direction that perpendicularly intersects the axial line, and a head that is coupled to the shaft portion and has a second outer diameter that is larger than the first outer diameter in the radial direction, a first end surface of the head including a flat surface that perpendicularly intersects the axial line and is formed into a circular shape with the axial line located at the center and an inclined surface that is disposed on an outer circumferential side in the radial direction beyond the flat surface and has a projecting length in a direction of the axial line with respect to the flat surface gradually decreasing from an inner circumferential side toward the outer circumferential side in the radial direction formed therein, the swaging device including: a first swaging member that is disposed in a state in which the first swaging member faces the first end surface of the head; a second swaging member that is disposed in a state in which the second swaging member faces a second end surface of the shaft portion; and a pressurizing mechanism that generates a pressurizing force of causing a distance between the first swaging member and the second swaging member along the axial line to decrease and plastically deforms the rivet, in which an end surface of the first swaging member includes a bottom surface that perpendicularly intersects the axial line and is formed into a circular shape with the axial line located at the center and a support surface that is disposed on the outer circumferential side in the radial direction beyond the bottom surface and has a projecting length in the direction of the axial line with respect to the bottom surface gradually increasing from the inner circumferential side toward the outer circumferential side in the radial direction formed therein, and an inclination angle of the support surface with respect to a plane that perpendicularly intersects the axial line is smaller than an inclination angle of the inclined surface with respect to the plane that perpendicularly intersects the axial line by a predetermined angle.

According to an aspect of the present disclosure, there is provided a swaging method that deforms a rivet inserted into a through-hole formed in a plurality of plate-shaped members disposed in a superimposed manner and secures the plurality of plate-shaped members, the rivet including a shaft portion that extends along an axial line and has a first outer diameter in a radial direction that perpendicularly intersects the axial line, and a head that is coupled to the shaft portion and has a second outer diameter that is larger than the first outer diameter in the radial direction, a first end surface of the head including a flat surface that perpendicularly intersects the axial line and is formed into a circular shape with the axial line located at the center and an inclined surface that is disposed on an outer circumferential side in the radial direction beyond the flat surface and has a projecting length in a direction of the axial line with respect to the flat surface gradually decreasing from an inner circumferential side toward the outer circumferential side in the radial direction formed therein, the swaging method including: a first disposing process of disposing a first swaging member in a state in which the first swaging member faces the first end surface of the head; a second disposing process of disposing a second swaging member in a state in which the second swaging member faces a second end surface of the shaft portion; and a swaging process of generating a pressurizing force of causing a distance between the first swaging member and the second swaging member along the axial line to decrease and plastically deforming the rivet, in which an end surface of the first swaging member includes a bottom surface that perpendicularly intersects the axial line and is formed into a circular shape with the axial line located at the center and a support surface that is disposed on the outer circumferential side in the radial direction beyond the bottom surface and has a projecting length in the direction of the axial line with respect to the bottom surface gradually increasing from the inner circumferential side toward the outer circumferential side in the radial direction formed therein, and an inclination angle of the support surface with respect to a plane that perpendicularly intersects the axial line is smaller than an inclination angle of the inclined surface with respect to the plane that perpendicularly intersects the axial line by a predetermined angle.

According to the present disclosure, it is possible to provide a swaging device and a swaging method that enable excessive plastic deformation of a head of a rivet to be curbed and enable degradation of fatigue strength at a part fastened with the rivet due to formation of a clearance between the rivet and a through-hole to be prevented.

DETAILED DESCRIPTION

Hereinafter, a swaging device 100 according to an embodiment of the present disclosure will be described with reference to the drawings.

The swaging device 100 in the present embodiment is a device that plastically deforms a rivet 200 inserted into a through-hole 330 formed in a plurality of plate-shaped members 310 and 320 disposed in a superimposed state and secures the plurality of plate-shaped members 310 and 320. The plurality of plate-shaped members 310 and 320 are, for example, aircraft body panels. The plurality of plate-shaped members 310 and 320 are formed using an aluminum alloy, for example. Although an example in which two plate-shaped members are disposed in a superimposed manner will be described in the present embodiment, an arbitrary number, such as three or more, of plate-shaped members may be disposed in a superimposed manner.

Figure 1:
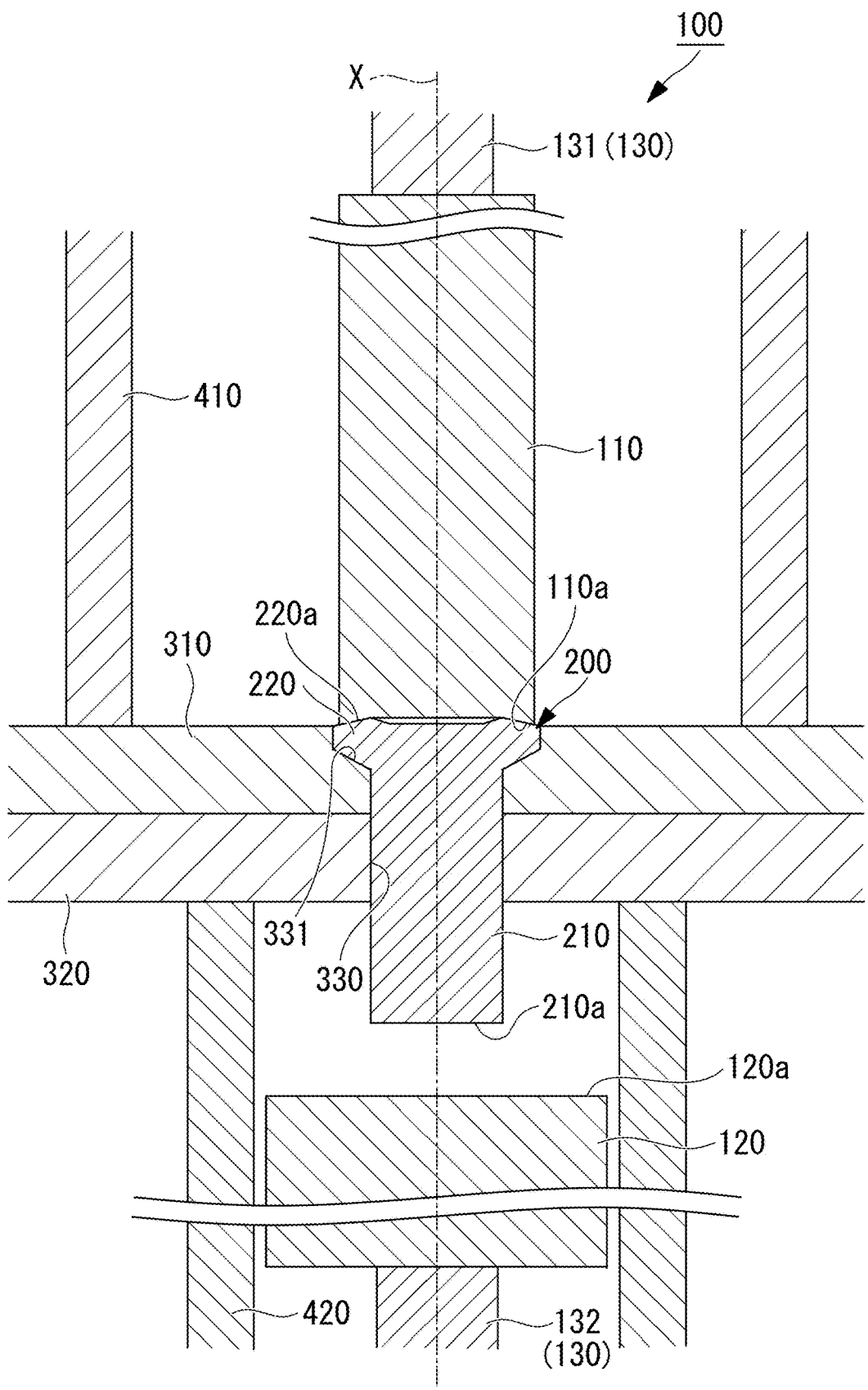
FIG. 1 is a sectional view illustrating a swaging device according to an embodiment of the present disclosure and illustrates a state before a rivet is plastically deformed.
Figure 2:
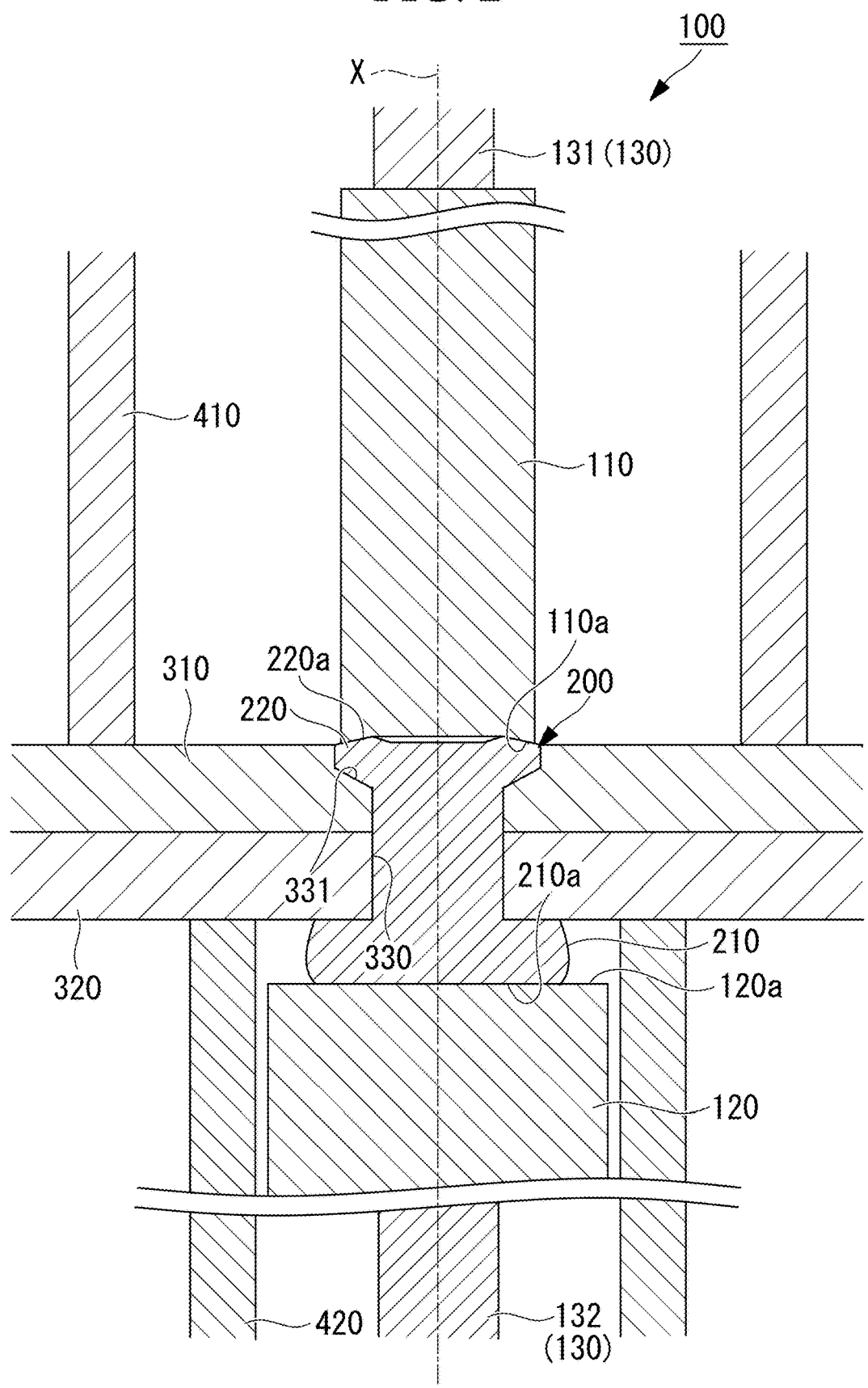
FIG. 2 is a sectional view illustrating the swaging device according to the embodiment of the present disclosure and illustrates a state after the rivet is plastically deformed.

FIG. 1 is a sectional view illustrating the swaging device 100 according to the embodiment of the present disclosure and illustrates a state before a rivet 200 is plastically deformed. FIG. 2 is a sectional view illustrating the swaging device 100 according to the embodiment of the present disclosure and illustrates a state after the rivet 200 is plastically deformed.

As illustrated in FIGS. 1 and 2, the plate-shaped member 310 disposed on the upper side is supported by a cylindrical upper support body 410 extending along an axial line X. The plate-shaped member 320 disposed on the lower side is supported by a cylindrical lower support body 420 extending along the axial line X. The plate-shaped member 310 and the plate-shaped member 320 are disposed in a state in which the plate-shaped member 310 and the plate-shaped member 320 are secured at predetermined positions on the axial line X by being supported by the upper support body 410 and the lower support body 420 in a sandwiched state. Here, the axial line X is a linear line extending in a direction that perpendicularly intersects planes in which the plurality of plate-shaped members 310 and 320 are disposed.

The through-hole 330 extending along the axial line X is formed in the plate-shaped member 310 and the plate-shaped member 320. The through-hole 330 is formed in the plate-shaped member 310 and the plate-shaped member 320 supported in a superimposed state by the upper support body 410 and the lower support body 420 using a punching mechanism (not illustrated) that moves forward and backward along the axial line X. A counterbore portion 331 for accommodating a head 220 of the rivet 200 is formed at an end portion of the through-hole 330 on the upper side.

As illustrated in FIGS. 1 and 2, the swaging device 100 includes an upper anvil (first swaging member) 110, a lower anvil (second swaging member) 120, and a pressurizing mechanism 130. The upper anvil 110 and the lower anvil 120 are formed using an iron-based metal material containing iron such as tool steel, for example, as a main constituent.

The upper anvil 110 is a member formed into a shaft shape extending along the axial line X and includes an end surface 110a that is disposed in a state in which the end surface 110a faces an end surface (first end surface) 220a of the head 220 of the rivet 200 inserted into the through-hole 330. The upper anvil 110 can be moved along the axial line X by the pressurizing mechanism 130 (upper pressurizing mechanism 131) and is disposed in a state in which the upper anvil 110 is in contact with the end surface 220a of the head 220 of the rivet 200 when a swaging operation of plastically deforming the rivet 200 is performed.

The lower anvil 120 is a member formed into a shaft shape extending along the axial line X and includes a pressurizing surface 120a disposed in a state in which the pressurizing surface 120a faces an end surface (second end surface) 210a of a shaft portion 210 of the rivet 200. The lower anvil 120 can be moved along the axial line X by the pressurizing mechanism 130 (lower pressurizing mechanism 132) and is disposed in a state in which the lower anvil 120 is in contact with the end surface 210a of the shaft portion 210 of the rivet 200 when the swaging operation of plastically deforming the rivet 200 is performed.

The pressurizing mechanism 130 is a mechanism that generates a pressurizing force of causing the distance between the upper anvil 110 and the lower anvil 120 along the axial line X to decrease and plastically deforms the rivet 200. The pressurizing mechanism 130 includes an upper pressurizing mechanism 131 that causes the upper anvil 110 to move along the axial line X and a lower pressurizing mechanism 132 that causes the lower anvil 120 to move along the axial line X.

The pressurizing mechanism 130 causes the lower anvil 120 to move from the position separated from the shaft portion 210 as illustrated in FIG. 1 to the position at which the lower anvil 120 comes into contact with the shaft portion 210 as illustrated in FIG. 2 in a state in which the end surface 110a of the upper anvil 110 is in contact with the end surface 220a of the head 220 of the rivet 200. The pressurizing mechanism 130 thus applies a pressurizing force to the rivet 200 and plastically deforms the rivet 200. As illustrated in FIG. 2, the shaft portion 210 of the rivet on the side of the end surface 210a is plastically deformed due to the pressurizing force applied by the pressurizing mechanism 130 and is plastically deformed into a substantially cylindrical shape with a larger outer diameter than the inner diameter of the through-hole 330.

In a swaging method executed by the swaging device 100 according to the present embodiment, the following processes are executed.

First, a support surface 112 of the upper anvil 110 is disposed in a state in which the support surface 112 faces and comes into contact with the end surface 220a of the head 220 of the rivet 200, as illustrated in FIG. 1 (first disposing process).

Second, the pressurizing surface 120a of the lower anvil 120 is disposed in a state in which the pressurizing surface 120a of the lower anvil 120 faces the end surface 210a of the shaft portion 210, as illustrated in FIG. 1 (second disposing process).

Third, the pressurizing mechanism 130 generates a pressurizing force of causing the distance between the upper anvil 110 and the lower anvil 120 along the axial line X to decrease and plastically deforms the rivet 200, as illustrated in FIG. 2 (swaging process).

Through the processes as described above, the swaging device 100 plastically deforms the rivet 200 inserted into the through-hole 330 formed in the plurality of plate-shaped members 310 and 320 disposed in a superimposed state and secures the plurality of plate-shaped members 310 and 320.

Figure 3:
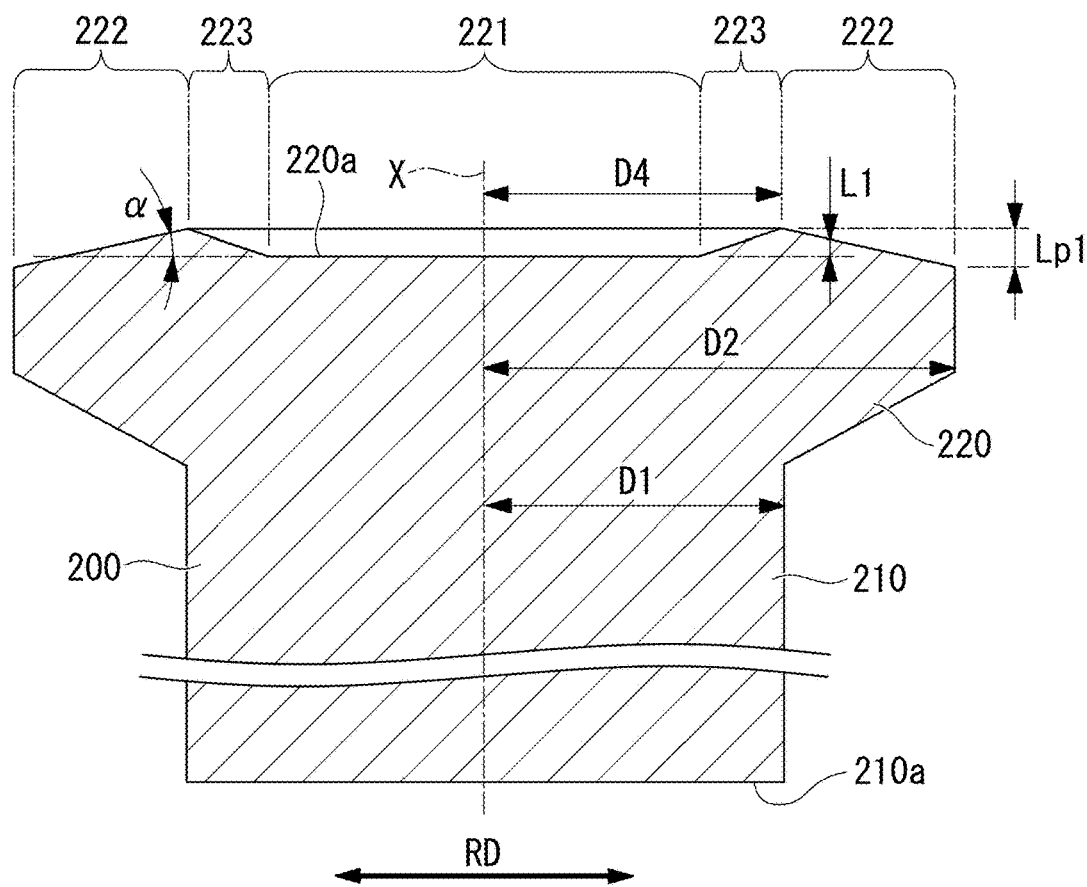
FIG. 3 is a sectional view illustrating the rivet before plastic deformation.
Figure 4:
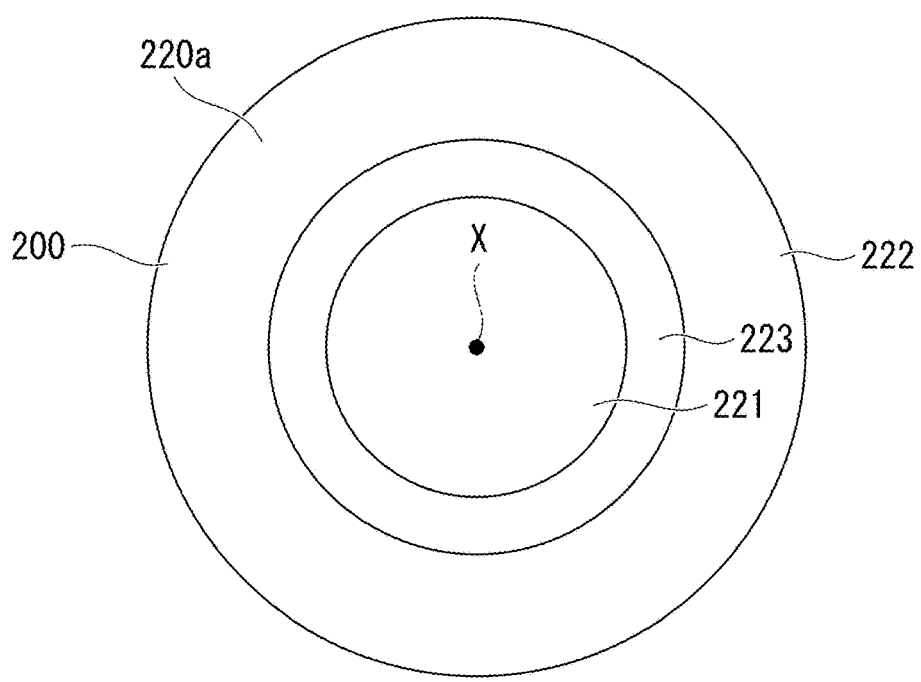
FIG. 4 is a plan view of an end surface of a head of the rivet illustrated in FIG. 3 when seen along an axial line.

Next, the rivet 200 that the swaging device 100 according to the present embodiment plastically deforms will be described with reference to the drawings. FIG. 3 is a sectional view illustrating the rivet 200 before plastic deformation. FIG. 4 is a plan view of the end surface 220a of the head 220 f the rivet 200 illustrated in FIG. 3 when seen along the axial line X.

The rivet 200 is a member that is inserted into the through-hole 330 formed in the plate-shaped member 310 and the plate-shaped member 320 and secures the plate-shaped member 310 and the plate-shaped member 320 through plastic deformation. The rivet 200 is formed using an aluminum alloy, for example.

As illustrated in FIG. 3, the rivet 200 includes the shaft portion 210 and the head 220. The shaft portion 210 extends along the axial line X and has an outer diameter (first outer diameter) D1 in a radial direction RD that perpendicularly intersects the axial line X. The head 220 is coupled to the shaft portion 210 and has an outer diameter (second outer diameter) D2 that is larger than the outer diameter D1 in the radial direction RD. The outer diameter D1 is, for example, 5 to 8 mm.

As illustrated in FIGS. 3 and 4, a flat surface 221, an inclined surface 222, and a coupling surface 223 are formed in the end surface 220a of the head 220. The flat surface 221 is a surface that perpendicularly intersects the axial line X and is formed into a circular and flat shape with the axial line X located at the center. The inclined surface 222 is disposed on the outer circumferential side in the radial direction RD beyond the flat surface 221. The inclined surface 222 is formed into an annual shape around the axial line X and has a projecting length L1 in the direction of the axial line X with respect to the flat surface 221 gradually decreasing with a constant gradient from the inner circumferential side toward the outer circumferential side in the radial direction RD.

The coupling surface 223 is a surface that is formed into an annular shape around the axial line X and couples the flat surface 221 and the inclined surface 222. The coupling surface 223 is disposed on the outer circumferential side in the radial direction RD beyond the flat surface 221 and is disposed on the inner circumferential side in the radial direction RD beyond the inclined surface 222. The coupling surface 223 has a projecting length in the direction of the axial line X with respect to the flat surface 221 gradually increasing with a constant gradient from the inner circumferential side toward the outer circumferential side in the radial direction RD. As illustrated in FIG. 3, the inclination angle of the inclined surface 222 with respect to a plane that perpendicularly intersects the axial line X is α, which is constant at each position in the circumferential direction around the axial line X.

Figure 5:
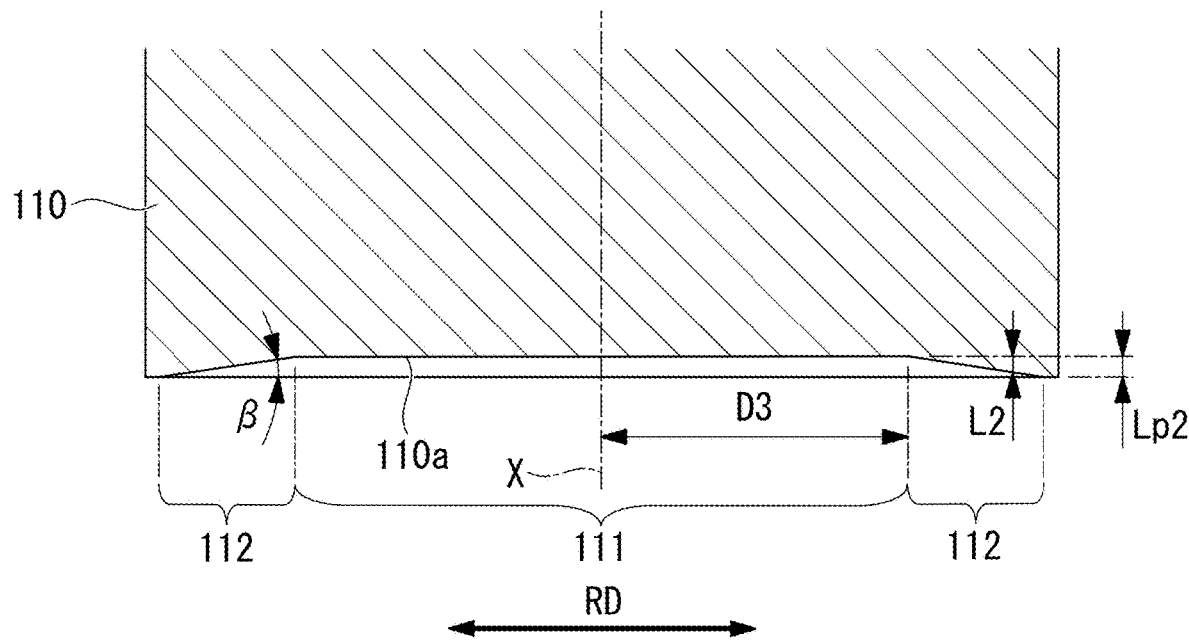
FIG. 5 is a partially enlarged view illustrating a section of an upper anvil.
Figure 6:
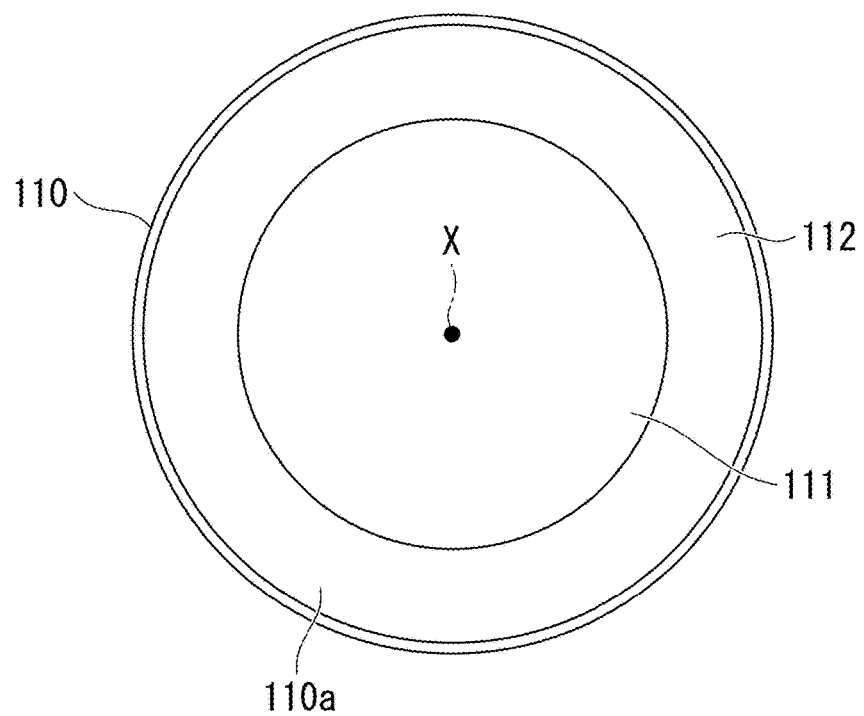
FIG. 6 is a plan view of an end surface of the upper anvil when seen along the axial line.

Next, the shape of the upper anvil 110 that the swaging device 100 according to the present embodiment has will be described with reference to the drawings. The shape of the upper anvil 110 satisfies Expressions (1) to (3) described below to prevent excessive plastic deformation of the head 220 of the rivet 200. FIG. 5 is a partially enlarged view illustrating a section of the upper anvil 110. FIG. 6 is a plan view of the end surface 110a of the upper anvil 110 when seen along the axial line X.

As illustrated in FIGS. 5 and 6, a bottom surface 111 and the support surface 112 are formed in the end surface 110a of the upper anvil 110. The bottom surface 111 perpendicularly intersects the axial line X and is formed into a circular and flat shape with the axial line X located at the center. The support surface 112 is a surface that supports the inclined surface 222 of the rivet 200 when the swaging operation is executed and is disposed on the outer circumferential side in the radial direction RD beyond the bottom surface 111. The support surface 112 is formed into an annular shape around the axial line X and has a projecting length L2 in the direction of the axial line X with respect to the bottom surface 111 gradually increasing with a constant gradient from the inner circumferential side toward the outer circumferential side in the radial direction RD.

As illustrated in FIG. 5, the inclination angle of the support surface 112 with respect to the plane that perpendicularly intersects the axial line X is $\beta$, which is constant at each position in the circumferential direction around the axial line X. The inclination angle $\beta$ of the support surface 112 with respect to the plane that perpendicularly intersects the axial line X is smaller than the inclination angle $\alpha$ of the inclined surface 222 with respect to the plane that perpendicularly intersects the axial line X by a predetermined angle A. In other words, the inclination angle α and the inclination angle β are set to satisfy Expression (1) below.

$$\beta = \alpha - A \quad (1)$$

Here, the predetermined angle A is set to be equal to or greater than 0.5 degrees and equal to or less than 5.0 degrees. Also, the predetermined angle A is preferably set to be equal to or greater than 2.0 degrees and equal to or less than 2.5 degrees.

As illustrated in FIG. 5, the distance in the direction of the axial line X from the end portion of the support surface 112 of the upper anvil 110 on the inner circumferential side in the radial direction RD to the end portion of the support surface 112 on the outer circumferential side in the radial direction RD is Lp2. On the other hand, as illustrated in FIG. 3, the distance in the direction of the axial line X from the end portion of the inclined surface 222 of the rivet 200 on the inner circumferential side in the radial direction RD to the end portion of the inclined surface 222 on the outer circumferential side in the radial direction RD is Lp1. Here, the distance Lp2 and the distance Lp1 are set to satisfy Expression (2) below.

$$Lp2 = Lp1 \cdot B \quad (2)$$

Here, the coefficient B is set to be equal to or greater than 0.1 and equal to or less than 1.0. More preferably, the coefficient B is set to be equal to or greater than 0.2 and equal to or less than 0.25. In other words, the distance Lp2 is set to be equal to or greater than 0.1 times and equal to or less than 1.0 times the distance Lp1. More preferably, the distance Lp2 is set to be equal to or greater than 0.2 times and equal to or less than 0.25 times the distance Lp1.

As illustrated in FIG. 5, the distance of the end portion of the support surface 112 on the inner circumferential side from the axial line X in the radial direction is D3. On the other hand, as illustrated in FIG. 3, the distance of the end surface of the inclined surface 222 on the inner circumferential side from the axial line X in the radial direction RD is D4. Here, the distance D3 and the distance D4 are set to satisfy Expression (3) below. In other words, the distance D3 and the distance D4 are set to conform to each other.

$$D4 = D3 \quad (3)$$

Note that although the shape of the end surface 110a of the upper anvil 110 is assumed to satisfy all Expressions (1) to (3) in the above description, another aspect may be employed. For example, the shape of the end surface 110a of the upper anvil 110 may be a shape that satisfies Expression (1) and Expression (2) and does not satisfy Expression (3).

Figure 7:
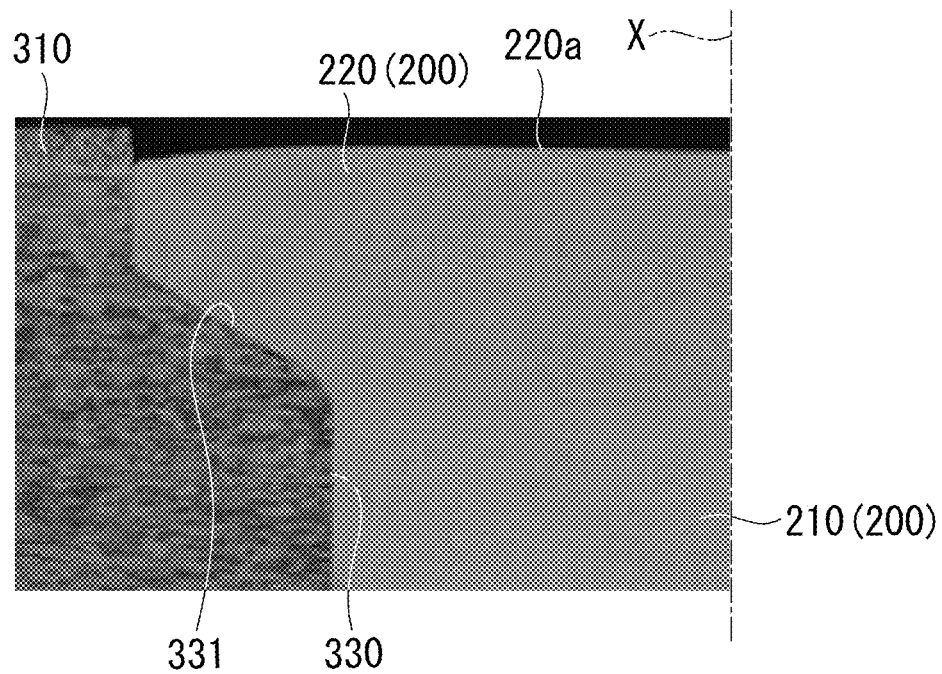
FIG. 7 is a diagram illustrating sections of the rivet and a plate-shaped member in a case in which the rivet is plastically deformed using the swaging device according to the present embodiment.
Figure 8:
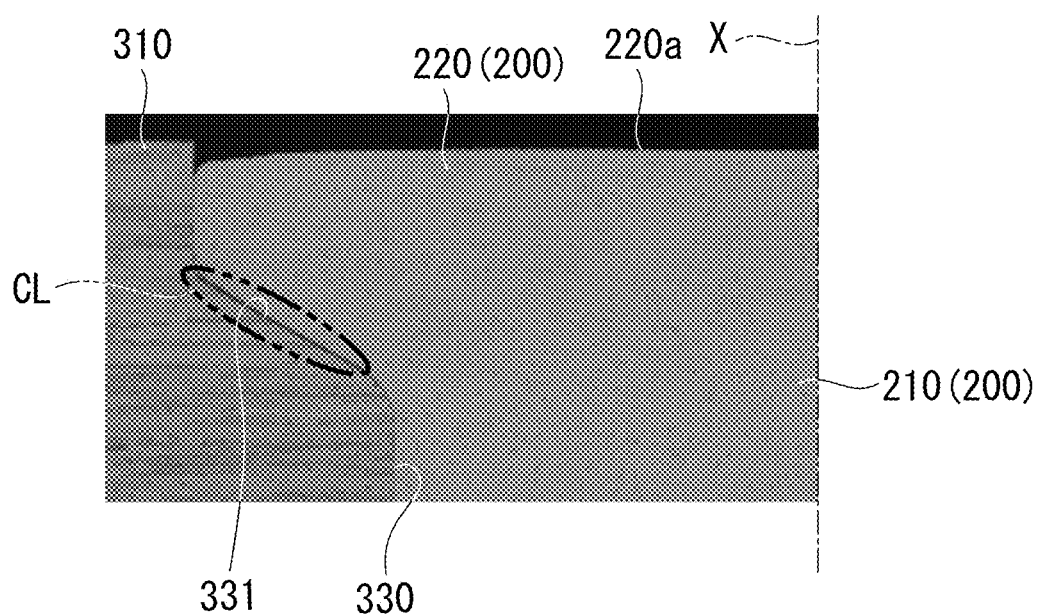
FIG. 8 is a diagram illustrating sections of the rivet and the plate-shaped member in a case in which the rivet is plastically deformed using a swaging device according to a comparative example.

Next, experiment results in a case in which the rivet 200 is plastically deformed by the swaging device 100 according to the present embodiment and in a case in which the rivet 200 is plastically deformed by a swaging device (not illustrated) according to a comparative example will be compared. FIG. 7 is a diagram illustrating sections of the rivet 200 and the plate-shaped member 310 in a case in which the rivet 200 is plastically deformed by the swaging device 100 according to the present embodiment. FIG. 8 is a diagram illustrating sections of the rivet 200 and the plate-shaped member 310 in a case in which the rivet 200 is plastically deformed by the swaging device according to the comparative example. The thicknesses of the plate-shaped members 310 illustrated in FIGS. 7 and 8 (the lengths thereof in the direction of the axial line X) are the same.

Figure 9:
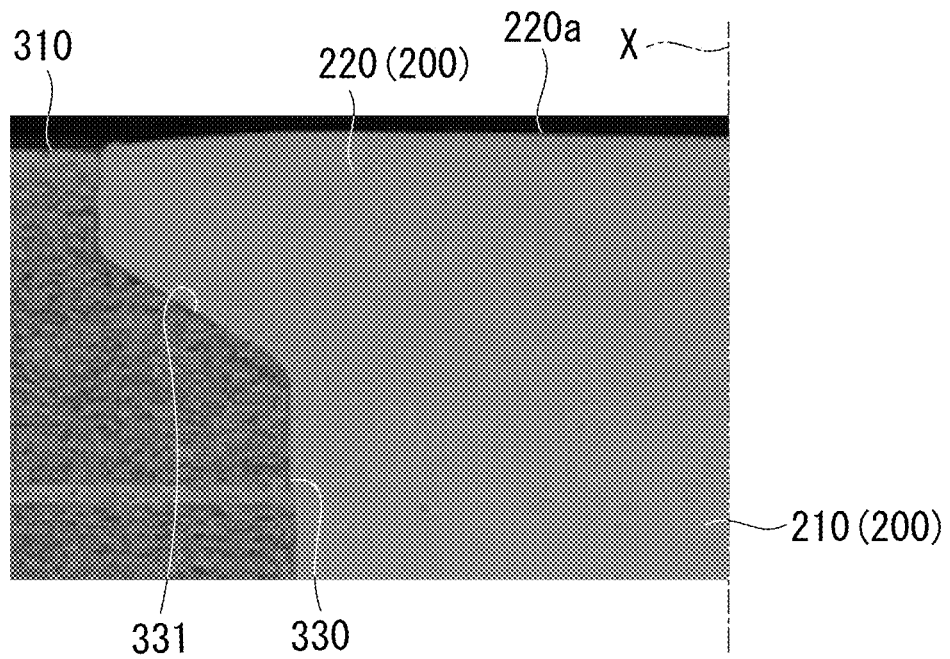
FIG. 9 is a diagram illustrating sections of the rivet and the plate-shaped member in a case in which the rivet is plastically deformed using the swaging device according to the present embodiment.
Figure 10:
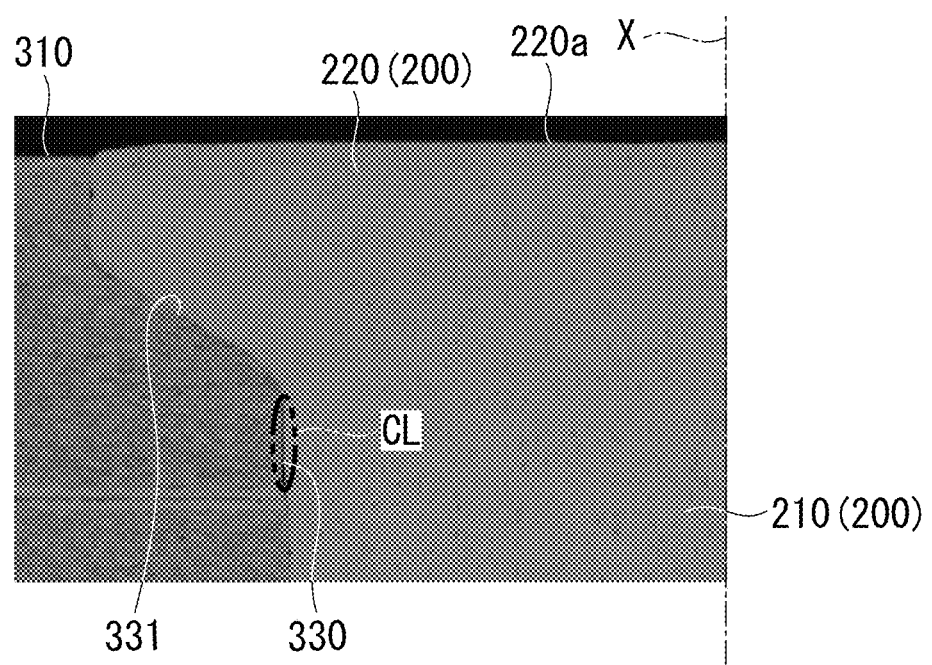
FIG. 10 is a diagram illustrating sections of the rivet and the plate-shaped member in a case in which the rivet is plastically deformed using the swaging device according to the comparative example.

FIG. 9 is a diagram illustrating sections of the rivet 200 and the plate-shaped member 310 in a case in which the rivet 200 is plastically deformed by the swaging device 100 according to the present embodiment. FIG. 10 is a diagram illustrating sections of the rivet 200 and the plate-shaped member 310 in a case in which the rivet 200 is plastically deformed by the swaging device according to the comparative example. The thicknesses of the plate-shaped members 310 illustrated in FIGS. 9 and 10 (the lengths in the direction of the axial line X) are the same. Also, the thicknesses of the plate-shaped members 310 illustrated in FIGS. 9 and 10 are thinner than the thicknesses of the plate-shaped members 310 illustrated in FIGS. 7 and 8.

In the swaging device 100 according to the present embodiment and the swaging device according to the comparative example, shapes of the end surfaces 110a of the upper anvils 110 are different from each other. The end surface 110a of the upper anvil 110 of the swaging device according to the comparative example is formed into a flat shape having only a flat surface that perpendicularly intersects the axial line X. Since the swaging device according to the comparative example does not have the support surface 112, the rivet 200 is plastically deformed such that the end surface 220a of the head 220 of the rivet 200 becomes closer to a flat shape.

As illustrated in FIGS. 7 and 9, according to the rivet 200 plastically deformed by the swaging device 100 in the present embodiment, no clearance is formed between the shaft portion 210 and the through-hole 330, and no clearance is formed between the head 220 and the counterbore portion 331. Here the clearance means an interval of equal to or greater than 0.01 mm, for example.

On the other hand, as illustrated in FIG. 8, according to the rivet 200 plastically deformed by the swaging device in the comparative example, a clearance CL is formed between the head 220 and the counterbore portion 331. In FIG. 8, it is considered that the clearance CL is formed because the upper anvil in the comparative example does not include the support surface 112 unlike the upper anvil 110 in the present embodiment.

In other words, this is considered to be because the end surface 220a of the head 220 of the rivet 200 that comes into contact with the upper anvil is excessively plastically deformed and a part in the vicinity of the counterbore portion 331 of the head 220 is plastically deformed in a direction separated from the counterbore portion 331 such that the clearance CL is provided between the end surface 220a and the counterbore portion 331 with the plastic deformation in the comparative example.

Such a phenomenon in which the clearance CL is formed between the head 220 of the rivet 200 and the counterbore portion 331 is likely to be generated in a case in which the thickness of the plate-shaped member 320 is relatively thick. This is considered to be because the amount of plastic deformation of the plate-shaped member 310 is small and the amount of plastic deformation of the head 220 of the rivet 200 is large in a case in which the thickness of the plate-shaped member 310 is relatively thick.

As illustrated in FIG. 10, according to the rivet 200 plastically deformed by the swaging device in the comparative example, the clearance CL is formed between the shaft portion 210 and the through-hole 330. In FIG. 10, it is considered that the clearance CL is formed because the upper anvil in the comparative example does not include the support surface 112 unlike the upper anvil 110 in the present embodiment.

In other words, this is considered to be because the end surface 220a of the head 220 of the rivet 200 that comes into contact with the upper anvil is excessively plastically deformed, the head 220 is significantly enlarged in the radial direction with the plastic deformation, and the plate-shaped member 310 is plastically deformed such that the inner diameter of the through-hole 330 is enlarged, in the comparative example.

Such a phenomenon in which the clearance CL is formed between the shaft portion 210 of the rivet 200 and the through-hole 330 is likely to occur in a case in which the thickness of the plate-shaped member 310 is relatively thin. This is considered to be because the amount of plastic deformation of the plate-shaped member 310 is large and the amount of plastic deformation of the head 220 of the rivet 200 is small in a case in which the thickness of the plate-shaped member 310 is relatively thin.

The swaging device (100) described in the aforementioned embodiment is understood as follows, for example.

The swaging device according to the present disclosure deforms the rivet (200) inserted into the through-hole formed in the plurality of plate-shaped members disposed in a superimposed state and secures the plurality of plate-shaped members, the rivet includes the shaft portion (210) that extends along the axial line (X) and has the first outer diameter (D1) in the radial direction that perpendicularly intersects the axial line (X), and the head (220) that is coupled to the shaft portion and has the second outer diameter (D2) that is larger than the first outer diameter in the radial direction, the first end surface (220a) of the head includes the flat surface (221) that perpendicularly intersects the axial line and is formed into a circular shape with the axial line located at the center and the inclined surface (222) that is disposed on the outer circumferential side in the radial direction beyond the flat surface and has the projecting length (L1) in the direction of the axial line with respect to the flat surface gradually decreasing from the inner circumferential side toward the outer circumferential side in the radial direction formed therein, the swaging device includes: the first swaging member (110) that is disposed in a state in which the first swaging member faces the first end surface of the head; the second swaging member (120) that is disposed in a state in which the second swaging member (120) faces the second end surface (220a) of the shaft portion; and the pressurizing mechanism (130) that generates a pressurizing force of causing the distance between the first swaging member and the second swaging member along the axial line to decrease and plastically deforms the rivet, the end surface of the first swaging member includes the bottom surface (111) that perpendicularly intersects the axial line and is formed into a circular shape with the axial line located at the center and the support surface (112) that is disposed on the outer circumferential side in the radial direction beyond the bottom surface and has the projecting length (L2) in the direction of the axial line (X) with respect to the bottom surface gradually increasing from the inner circumferential side toward the outer circumferential side in the radial direction formed therein, and the inclination angle (β) of the support surface with respect to the plane that perpendicularly intersects the axial line is smaller than the inclination angle (α) of the inclined surface with respect to the plane that perpendicularly intersects the axial line by the predetermined angle.

According to the swaging device in the present disclosure, it is possible to secure the plurality of plate-shaped members with the rivet by causing the first swaging member to come into contact with the first end surface of the head of the rivet inserted into the through-hole formed in the plurality of plate-shaped members, causing the second swaging member to come into contact with the second end surface of the shaft portion of the rivet, and plastically deforming the rivet with the pressurizing force generated by the pressurizing mechanism. When the pressurizing mechanism generates the pressurizing force, the inclined surface that the end surface of the head of the rivet has is brought into a state in which the inclined surface is supported by the support surface that the first swaging member has.

The inclined surface of the rivet projects from the flat surface and is pressurized by the pressurizing mechanism in a state in which the projecting part is in contact with the support surface. In this manner, the head of the rivet is plastically deformed to be enlarged in the radial direction, and the rivet is brought into close contact with the through-hole into which the rivet is inserted. Also, the support surface that comes into contact with the inclined surface of the rivet is inclined such that the projecting length in the direction of the axial line with respect to the bottom surface gradually increases from the inner circumferential side toward the outer circumferential side in the radial direction. Also, the inclination angle of the support surface of the first swaging member is smaller than the inclination angle of the inclined surface of the rivet by the predetermined angle.

Therefore, it is possible to appropriately plastically deform the head of the rivet without causing excessive plastic deformation of the head of the rivet as compared with a case in which the inclined surface of the rivet is supported by a flat surface that perpendicularly intersects the axial line. It is thus possible to curb degradation of fatigue strength at a part fastened with the rivet due to formation of a clearance between the rivet and the through-hole caused by excessive plastic deformation of the head of the rivet.

In the swaging device according to an aspect of the present disclosure, the predetermined angle is preferably equal to or greater than 0.5 degrees and equal to or less than 5.0 degrees. Particularly, the predetermined angle is preferably equal to or greater than 2.0 degrees and equal to or less than 2.5 degrees.

It is possible to appropriately plastically deform the head of the rivet without causing excessive plastic deformation by setting the inclination angle of the support surface of the first swaging member to be smaller than the inclination angle of the inclined surface of the rivet bey the predetermined angle and setting the predetermined angle to be equal to or greater than 0.5 degrees and equal to or less than 5.0 degrees (more preferably, equal to or greater than 2.0 degrees and equal to or less than 2.5 degrees).

In the swaging device according to an aspect of the present disclosure, the distance in the direction of the axial line from the end portion of the support surface on the inner circumferential side in the radial direction to the end portion of the support surface on the outer circumferential side in the radial direction is preferably equal to or greater than 0.1 times and equal to or less than 1.0 times the distance in the direction of the axial line from the end portion of the inclined surface on the inner circumferential side in the radial direction to the end portion of the inclined surface on the outer circumferential side in the radial direction. Particularly, the distance in the direction of the axial line from the end portion of the support surface on the inner circumferential side in the radial direction to the end portion of the support surface on the outer circumferential side in the radial direction is preferably equal to or greater than 0.2 times and equal to or less than 0.25 times the distance in the direction of the axial line from the end portion of the inclined surface on the inner circumferential side in the radial direction to the end portion of the inclined surface on the outer circumferential side in the radial direction.

In this manner, it is possible to cause the support surface of the first swaging member to come into contact with an appropriate region in the inclined surface of the rivet and to appropriately plastically deform the head of the rivet without causing excessive plastic deformation.

In the swaging device according to an aspect of the present disclosure, the distance of the end portion of the support surface on the inner circumferential side from the axial line in the radial direction and the distance of the end portion of the inclined surface on the inner circumferential side from the axial line in the radial direction preferably conform to each other.

In this manner, it is possible to achieve a state in which the entire region of the support surface of the first swaging member comes into contact with the inclined surface of the rivet and to appropriately plastically deform the head of the rivet without causing excessive plastic deformation.

The swaging method described in the aforementioned embodiment is understood as follows, for example.

The swaging method according to the present disclosure is a swaging method that deforms the rivet inserted into the through-hole formed in the plurality of plate-shaped members disposed in a superimposed state and secures the plurality of plate-shaped members, the rivet includes the shaft portion that extends along the axial line and has the first outer diameter in the radial direction that perpendicularly intersects the axial line and the head that is coupled to the shaft portion and has the second outer diameter that is larger than the first outer diameter in the radial direction, the first end surface of the head includes the flat surface that perpendicularly intersects the axial line and is formed into a circular shape with the axial line located at the center and the inclined surface that is disposed on the outer circumferential side in the radial direction beyond the flat surface and has the projecting length in the direction of the axial line with respect to the flat surface gradually decreasing from the inner circumferential side toward the outer circumferential side in the radial direction formed therein, the swaging method includes: the first disposing process of disposing the first swaging member in a state in which the first swaging member faces the first end surface of the head; the second disposing process of disposing the second swaging member in a state in which the second swaging member faces the second end surface of the shaft portion; and the swaging process of generating the pressurizing force of causing the distance between the first swaging member and the second swaging member along the axial line to decrease and plastically deforming the rivet, the end surface of the first swaging member includes the bottom surface that perpendicularly intersects the axial line and is formed into a circular shape with the axial line located at the center and the support surface that is disposed on the outer circumferential side in the radial direction beyond the bottom surface and has the projecting length in the direction of the axial line with respect to the bottom surface gradually increasing from the inner circumferential side toward the outer circumferential side in the radial direction formed therein, and the inclination angle of the support surface with respect to the plane that perpendicularly intersects the axial line is smaller than the inclination angle of the inclined surface with respect to the plane that perpendicularly intersects the axial line by the predetermined angle.

According to the swaging method in the present disclosure, it is possible to secure the plurality of plate-shaped members with the rivet by causing the first swaging member to come into contact with the first end surface of the head of the rivet inserted into the through-hole formed in the plurality of plate-shaped members, causing the second swaging member to come into contact with the second end surface of the shaft portion of the rivet, and plastically deforming the rivet with the pressurizing force generated in the swaging process. When the pressurizing force is generated in the swaging process, the inclined surface that the end surface of the head of the rivet has is brought into a state in which the inclined surface is supported by the support surface that the first swaging member has.

The inclined surface of the rivet projects from the flat surface, and the projecting part is pressurized in the swaging process in a state in which the part is in contact with the support surface. In this manner, the head of the rivet is plastically deformed to be enlarged in the radial direction, and the rivet is brought into a close contact with the through-hole into which the rivet is inserted. Also, the support surface that comes into contact with the inclined surface of the rivet is inclined such that the projecting length in the direction of the axial line with respect to the bottom surface gradually increases from the inner circumferential side toward the outer circumferential side in the radial direction. Also, the inclination angle of the support surface of the first swaging member is smaller than the inclination angle of the inclined surface of the rivet by the predetermined angle.

Therefore, it is possible to appropriately plastically deform the head of the rivet without causing excessive plastic deformation as compared with a case in which the inclined surface of the rivet is supported by a flat surface that perpendicularly intersects the axial line. It is thus possible to curb degradation of fatigue strength at a part fastened with the rivet due to formation of a clearance between the rivet and the through-hole caused by excessive plastic deformation of the head of the rivet.

In the swaging method according to an aspect of the present disclosure, the predetermined angle is preferably equal to or greater than 0.5 degrees and equal to or less than 5.0 degrees. Particularly, the predetermined angle is preferably equal to or greater than 2.0 degrees and equal to or less than 2.5 degrees.

It is possible to appropriately plastically deform the head of the rivet without causing excessive plastic deformation by setting the inclination angle of the support surface of the first swaging member to be smaller than the inclination angle of the inclined surface of the rivet by the predetermined angle and setting the predetermined angle to be equal to or greater than 0.5 degrees and equal to or less than 5.0 degrees (more preferably equal to or greater than 2.0 degrees and equal to or less than 2.5 degrees).

In the swaging method according to an aspect of the present disclosure, the distance in the direction of the axial line from the end portion of the support surface on the inner circumferential side in the radial direction to the end portion of the support surface on the outer circumferential side in the radial direction is preferably equal to or greater than 0.1 times and equal to or less than 1.0 times the distance in the direction of the axial line from the end portion of the inclined surface on the inner circumferential side in the radial direction to the end portion of the inclined surface on the outer circumferential side in the radial direction. Particularly, the distance in the direction of the axial line from the end portion of the support surface on the inner circumferential side in the radial direction to the end portion of the support surface on the outer circumferential side in the radial direction is preferably equal to or greater than 0.2 times and equal to or less than 0.25 times the distance in the direction of the axial line from the end portion of the inclined surface on the inner circumferential side in the radial direction to the end portion of the inclined surface on the outer circumferential side in the radial direction.

In this manner, it is possible to cause the support surface of the first swaging member to come into contact with the appropriate region in the inclined surface of the rivet and to appropriately plastically deform the head of the rivet without causing excessive plastic deformation.

In the swaging method according to an aspect of the present disclosure, the distance of the end portion of the support surface on the inner circumferential side from the axial line in the radial direction and the distance of the end portion of the inclined surface on the inner circumferential side from the axial line in the radial direction preferably conform to each other.

In this manner, it is possible to achieve a state in which the entire region of the support surface of the first swaging member is in contact with the inclined surface of the rivet and to appropriately plastically deform the head of the rivet without causing excessive plastic deformation.

What is claimed is:

1. A swaging method that deforms a rivet inserted into a through-hole formed in a plurality of plate-shaped members disposed in a superimposed manner and secures the plurality of plate-shaped members,
    the rivet including
        a shaft portion that extends along an axial line and has
            a first outer diameter in a radial direction that perpendicularly intersects the axial line, and
            a head that is coupled to the shaft portion and has a second outer diameter that is larger than the first outer diameter in the radial direction,
    a first end surface of the head including
        a flat surface that perpendicularly intersects the axial line and is formed into a circular shape with the axial line located at a center of the head,
        an inclined surface that is formed into an annular shape around the axial line, a first axial projecting length of the inclined surface with respect to the flat surface gradually decreasing from a radially inner end of the inclined surface towards a radially outer end of the inclined surface, and
        a coupling surface that couples the flat surface and the inclined surface and that is formed into an annular shape around the axial line, a second axial projecting length of the coupling surface with respect to the flat surface gradually increasing from a radially inner end of the coupling surface towards a radially outer end of the coupling surface,
    the swaging method comprising:
        a first disposing process of disposing a first swaging member in a state in which the first swaging member faces the first end surface of the head;
        a second disposing process of disposing a second swaging member in a state in which the second swaging member faces a second end surface of the shaft portion; and
        a swaging process of generating a pressurizing force causing a distance between the first swaging member and the second swaging member along the axial line to decrease and plastically deforming the rivet,
    wherein an end surface of the first swaging member includes
        a bottom surface that perpendicularly intersects the axial line and is formed into a circular shape with the axial line located at a center of the first swaging member and
        a support surface that is formed into an annular shape around the axial line, a third axial projecting length of the support surface with respect to the bottom surface gradually increasing from a radially inner end of the support surface towards a radially outer end of the support surface,
    the inclined surface of the rivet is pressurized in the swaging process in a state in which the inclined surface is in contact with the support surface, and
    an inclination angle of the support surface with respect to a plane that perpendicularly intersects the axial line is smaller than an inclination angle of the inclined surface with respect to the plane that perpendicularly intersects the axial line by a predetermined angle.

2. The swaging method according to claim 1, wherein the predetermined angle is equal to or greater than 0.5 degrees and equal to or less than 5.0 degrees.

3. The swaging method according to claim 1, wherein the predetermined angle is equal to or greater than 2.0 degrees and equal to or less than 2.5 degrees.

4. The swaging method according to claim 1, wherein a distance in the direction of the axial line from the radially inner end of the support surface to the radially outer end of the support surface is equal to or greater than 0.1 times and equal to or less than 1.0 times a distance in the direction of the axial line from the radially inner end of the inclined surface to the radially outer end of the inclined surface.

5. The swaging method according to claim 1, wherein a distance in the direction of the axial line from the radially inner end of the support surface to the radially outer end of the support surface is equal to or greater than 0.2 times and equal to or less than 0.25 times a distance in the direction of the axial line from the radially inner end of the inclined surface to the radially outer end of the inclined surface.

6. The swaging device according to claim 1, wherein a distance of the radially inner end of the support surface from the axial line in the radial direction and a distance of the radially inner end of the inclined surface from the axial line in the radial direction conform to each other.

7. The swaging method according to claim 1, wherein a distance between the radially inner end of the support surface and the axial line in the radial direction and a distance between the radially inner end of the inclined surface and the axial line in the radial direction are set to conform to each other.

8. The swaging method according to claim 1, wherein each of the inclination angle of the support surface with respect to the plane that perpendicularly intersects the axial line and the inclination angle of the inclined surface with respect to the plane that perpendicularly intersects the axial line is an acute angle.

* * * * *